(12) United States Patent
Friedli (10) Patent No.: US 12,545,551 B2
(45) Date of Patent: Feb. 10, 2026

(54) DATA CAPTURE DEVICE FOR AN ELEVATOR SYSTEM AND A BUILDING ACCESS CONTROL SYSTEM

(71) Applicant: INVENTIO AG, Hergiswil (CH)

(72) Inventor: Tobias Friedli, Baden (CH)

(*) Notice: Subject to any disclaimer, the term of this patent is extended or adjusted under 35 U.S.C. 154(b) by 1418 days.

(21) Appl. No.: 17/134,931

(22) PCT Filed: Jun. 25, 2019

(86) PCT No.: PCT/EP2019/066730
§ 371 (c)(1),
(2) Date: Dec. 28, 2020

(87) PCT Pub. No.: WO2020/002268
PCT Pub. Date: Jan. 2, 2020

(65) Prior Publication Data
US 2022/0348437 A1    Nov. 3, 2022

(30) Foreign Application Priority Data

Jun. 27, 2018  (EP) ..................... 18180194

(51) Int. Cl.
*B66B 1/46* (2006.01)
*B66B 1/34* (2006.01)
(Continued)

(52) U.S. Cl.
CPC ............ *B66B 1/468* (2013.01); *B66B 1/3461* (2013.01); *B66B 1/463* (2013.01); *G06K 7/0004* (2013.01);
(Continued)

(58) Field of Classification Search
CPC ....... B66B 1/468; B66B 1/3461; B66B 1/463; G06K 7/10415; G06K 7/0004; G06K 7/1097
See application file for complete search history.

(56) References Cited

U.S. PATENT DOCUMENTS

| 5,689,094 A | 11/1997 | Friedli et al. |
| 2008/0180215 A1 | 7/2008 | Mott |

(Continued)

FOREIGN PATENT DOCUMENTS

| CN | 101510324 A | 8/2009 |
| CN | 206783040 U | 12/2017 |

(Continued)

OTHER PUBLICATIONS

Color version of IDS dated Dec. 28, 2020 document NPL1 "Factsheet PORT1 Wide". Document date 2018.*

(Continued)

*Primary Examiner* — Courtney D Heinle
*Assistant Examiner* — John S Hunter, Jr.
(74) *Attorney, Agent, or Firm* — Schlee IP International, PC; Alexander R. Schlee; Pascal A. Schlee (57) ABSTRACT

A data capture device for a building system has a housing in which a display device, an optical reading device, and a first reading device are arranged and which are communicatively connected to a control device arranged in the housing. The optical reading device is embodied to optically detect information from a first information carrier, wherein the optical reading device is arranged in such a way that light from the direction of the front side of the housing, which is accessible to a user, can be captured by an image sensor of the optical reading device. The first reading device has a first antenna in order to detect information from a second information carrier by means of radio communication, the first antenna comprising an air coil which has an inner space. The image sensor of the optical reading device is arranged entirely or partially in the inner space of the air coil.

14 Claims, 3 Drawing Sheets

(51) Int. Cl.
    *G06K 7/00*    (2006.01)
    *G06K 7/10*    (2006.01)
(52) U.S. Cl.
    CPC ..... *G06K 7/10415* (2013.01); *G06K 7/10732* (2013.01); *G06K 7/1097* (2013.01); *B66B 2201/4615* (2013.01); *B66B 2201/4638* (2013.01); *B66B 2201/4653* (2013.01); *B66B 2201/4676* (2013.01)

(56) References Cited

U.S. PATENT DOCUMENTS

| | | |
|---|---|---|
| 2012/0168262 A1 | 7/2012 | Finschi |
| 2015/0244063 A1 | 8/2015 | Sowpati |
| 2018/0162688 A1 | 6/2018 | Troesch et al. |

FOREIGN PATENT DOCUMENTS

| | | |
|---|---|---|
| EP | 0699617 B1 | 5/2000 |
| TW | M462395 U | 9/2013 |
| WO | WO2016198548 A1 | 10/2012 |
| WO | WO2015049186 A1 | 4/2015 |

OTHER PUBLICATIONS

Factsheet PORT1 Wide (Schindler Elevator Ltd., Switzerland 2018).

* cited by examiner

DATA CAPTURE DEVICE FOR AN ELEVATOR SYSTEM AND A BUILDING ACCESS CONTROL SYSTEM

CROSS-REFERENCE TO RELATED APPLICATIONS

This application is the national phase application under 35 U.S.C. § 371 claiming the benefit of priority based on International Patent Application No. PCT/EP2019/066730, filed on Jun. 25, 2019, which claims the benefit of priority based on European Patent Application No. 18180194.5 filed on Jun. 27, 2018. The contents of each of these applications are hereby incorporated by reference in their entirety.

FIELD OF THE INVENTION

The technology described herein relates in general to a data capture device. Exemplary embodiments of the technology relate in particular to a data capture device that detects data from an information carrier assigned to a user, and relate to a building system with such a data capture device.

BACKGROUND OF THE INVENTION

A known building system is an elevator system, and another known building system is an access control system. In a building with an elevator system, data capture devices are arranged on the individual floors and can be used by a user to call an elevator, for example by entering a destination floor. In an access control system, data capture devices can be arranged at a building entrance, e.g. on an outer wall of the building and/or at an entrance to a restricted-access zone within a building, in order to present a proof of authorization there. Each of the data capture devices arranged on the floors for an elevator system has either a keyboard, a touch-sensitive screen, and/or a reading device (e.g. in the form of an RFID card reading device known from EP 0699617 B1, in the form of a (Bluetooth) radio module known from EP 2238067, or in the form of a reading device for an optical code known from WO 2015049186 A1 for entering the destination floor. These reading devices can also be used in connection with a (physical) access control system, as is described, for example, in WO 2015049186 A1.

Elevator systems and/or access control systems are usually used in buildings having several floors, and possibly a large number of floors, and a correspondingly high volume of traffic. Traffic can include not only users who are familiar with the building and thus with the data capture devices installed therein, but also users who enter the building for the first time or only occasionally and are therefore not familiar with the data capture devices. There is therefore a need for a technology which makes it possible to create a user-friendly data capture device of low technical complexity.

SUMMARY OF THE INVENTION

One aspect relates to a data capture device for a building system. The data capture device comprises a housing, a display device arranged in the housing, an optical reading device arranged in the housing, a first reading device arranged in the housing, and a control device arranged in the housing. The control device is communicatively connected to the display device, the optical reading device, and the first reading device. The optical reading device is embodied to optically detect information from a first information carrier and is arranged such that light from the direction of a front side of the housing, which is accessible to a user, can be captured by an image sensor of the optical reading device. The first reading device has a first antenna for detecting information from a second information carrier by means of radio communication. The first antenna comprises an air coil which has an inner space. The image sensor of the optical reading device is arranged entirely or partially in the inner space of the air coil.

The technology described here creates a user-friendly data capture device that users can operate intuitively, specifically regardless of which type of information carrier a user uses (e.g. an information carrier with an optical code shown thereon or an information carrier based on RFID technology). The user-friendliness is achieved, for example, in that the image sensor is arranged within the air coil, so that both the optical detection and the detection by radio communication take place within a defined region of the data capture device. The users can present the information carriers at essentially the same point on the data capture device. This is particularly advantageous for those users who are not familiar with the operation of a data capture device, for example because they are entering the building for the first time or enter it only occasionally.

The arrangement of the image sensor in the interior of the air coil also makes better use of the space available in the data capture device. Such optimization of the use of space is advantageous if the data capture device is subject, for example, to restrictions in terms of size, shape or volume. The arrangement of the first reading device and the optical reading device, including the associated control devices, can be optimized, e.g., so that these can be arranged as compactly as possible and in the smallest possible space and thus can be accommodated in relatively small housings. This has the advantage that an arrangement optimized for small housings can also be accommodated in larger housings; among other things, the data capture device, in particular the design of the housing, can be adapted for a specific use inexpensively and flexibly.

Because a data capture device according to the technology described here can be used for different types of information carrier, the users can flexibly choose the type of information carrier. One company located in the building can choose as information carriers, e.g. for its employees, mobile electronic communication units (e.g. smartphones) which are provided for displaying an optical code, while another company or private individuals can choose (sometimes less expensive) transponder cards based on RFID technology as information carriers.

Another aspect of the technology described here relates to a building system with at least one data capture device. In one exemplary embodiment, for inputting an elevator call the at least one data capture device is arranged on a floor of the building. In one exemplary embodiment, such a data capture device is a part of an elevator system. In another exemplary embodiment, the at least one data capture device is arranged at an entrance to a region with restricted access. In one exemplary one embodiment, such a data capture device is a part of an access control system. The access can include, for example, an exterior door and/or an interior door, or some other type of entrance with or without a physical barrier. In one exemplary embodiment, the building system can comprise a combination of an elevator system and an access control system. It is an advantage that the data capture device can also be used in such a building system.

The information carriers used in connection with a data capture device described here represent a type of proof of authorization. The information carriers store data, for example in a memory device (e.g., a memory chip) and/or encoded as an optical code, which can be used, for example, to identify a user. If the user can be identified, he is considered to be authorized to use the building and/or certain regions or facilities in the building. This use is denied to an unidentifiable user.

In one exemplary embodiment, the aforementioned intuitive operation of the data capture device is supported in that a marking element is present on the front side of the housing so that it is visible to a user. The marking element marks a region in which the air coil and the image sensor arranged in its interior are arranged, i.e., the point at which an information carrier is to be presented is marked. There is a high degree of flexibility in terms of material, design, and functionality (e.g. embodiment as an active or passive element) in the design of the marking element. In one exemplary embodiment, the marking element comprises a color-coded circular marking. A different shape can also be used for the marking instead of a circular marking. The color coding can be, for example, a white circle on a dark glass surface; the circle can be illuminated (active) or not illuminated (passive).

In one exemplary embodiment, the front side of the housing is transparent to light to be detected by the image sensor in the region marked by the marking element. Various options are possible for the design of the marked region; the marked region can comprise a material that is transparent to the light to be detected (e.g., glass or plastic) or a material-free opening (e.g., a hole). The marked region also permits the information to be detected by means of radio communication; i.e., the housing is permeable to electromagnetic waves propagating during radio communication, at least in the marked region.

In one exemplary embodiment, intuitive operation of the data capture device is supported in that a light source is arranged in the housing and can be used to illuminate the marking element. The light source can illuminate an inner side of the front of the housing, for example, so that the marked region is set off in color from the rest of the front. The light source can comprise one or a plurality of light-emitting diodes (LED); LEDs have low electrical power consumption, produce little heat loss, and allow a high degree of flexibility with regard to choice of color. As a result, the marked region can also be identified in a standby mode for users (including in poor lighting conditions) without being associated with increased energy consumption by the data capture device. Such light sources also reduce the complexity of the data capture device and offer great design leeway with regard to the size and shape of the data capture device.

In one exemplary embodiment, the marking element has a light source arranged in the housing. In this example, the light source is a part of the marking element. In one exemplary embodiment, the light source is integrated in a diffuser, or feeds light into the latter. In this way, for example, uniform distribution of light, and thus good illumination of the marking element, can be achieved. The marking element can be designed, for example, so that a white or colored ring is visible on the front side of the housing. In one exemplary embodiment, the diffuser is selected to be annular. The person skilled in the art recognizes that the diffuser can also have a different shape.

In one exemplary embodiment, the data capture device has a carrier element on which the optical reading device and the first reading device are arranged. The carrier element has an opening through which a passage is created between a first side and a second side of the carrier element. The air coil surrounds the opening. The image sensor of the optical reading device can be arranged such that it does not project into the opening; however, it can also partially project into the opening, or it can extend through the opening. As a result, a compact arrangement of the image sensor and the air coil can be created on the carrier element because, for example, both sides of the carrier element and the spaces there can be used for fastening and contacting the image sensor and the air coil.

In one exemplary embodiment, the optical reading device comprises a digital camera that includes the image sensor. Such a digital camera is available in a compact design and can be arranged, with or without a socket, on the carrier element such that the digital camera is arranged entirely or partially in the interior of the air coil.

In one exemplary embodiment, the first reading device is embodied, in conjunction with the first antenna, for radio communication in a frequency range of approx. 100 kHz-200 kHz, in particular for a frequency of approx. 125 kHz or approx. 134 kHz. Correspondingly, the technology for known transponders can be used in the building.

In one exemplary embodiment, the data capture device has a second reading device and a second antenna which are designed for radio communication in a second frequency range, for example, for radio communication in a frequency range of approx. 4 MHz-approx. 20 MHz, in particular for a frequency of approx. 13.56 MHz. The technology for known transponders can also be used for this frequency range in the building. In one exemplary embodiment, the second antenna is integrated into the carrier element in a space-saving manner.

In a further exemplary embodiment, the data capture device has a radio transceiver for communication with a communication device of a user, the radio transceiver being connected to the control device. The radio transceiver is configured, for example, for communication in accordance with a Bluetooth standard. The communication device can be, e.g., a mobile phone, a smartphone, or a tablet PC that users already frequently carry with them. In many cases, such a communication device has a radio module which is configured for communication in accordance with a Bluetooth standard.

In one exemplary embodiment, the data capture device comprises an input device with a keyboard or a touch-sensitive surface (e.g., a touchscreen). A touchscreen is low-maintenance, since it does not require any mechanically moving components, is easy to clean, which is particularly important for components that are touched by many people, and is relatively inexpensive. A user can use this input device to manually enter an elevator call and/or a proof of authorization (e.g. a personal identification number (PIN)). This option for operating the data capture device can be used, for example, by users who do not have any of the information carriers mentioned above (e.g. because they are one-time or only occasional visitors) or who do not currently have their specific information carrier with them.

As mentioned above, the technology described here offers users flexibility with regard to the type of information carrier; they can choose, e.g., between an RFID transponder and a carrier (e.g. plastic, paper, or mobile communication device) on which an optical code is displayed. The second reading device, in conjunction with the second antenna, provides a further option. Equipped with a radio transceiver (e.g. according to a Bluetooth technology), the data capture device according to the technology described here offers an additional option for choosing the information carrier. Regardless of these information carriers, the data capture device also offers the option to enter data manually. Thus, the technology described here also creates a multi-option data capture device.

BRIEF DESCRIPTION OF THE DRAWINGS

Various aspects of the improved technology are described in greater detail below with reference to exemplary embodiments in conjunction with the drawings. In the figures, identical elements have identical reference numbers. The drawings show the following.

DETAILED DESCRIPTION OF EMBODIMENTS OF THE INVENTION

Figure 1:
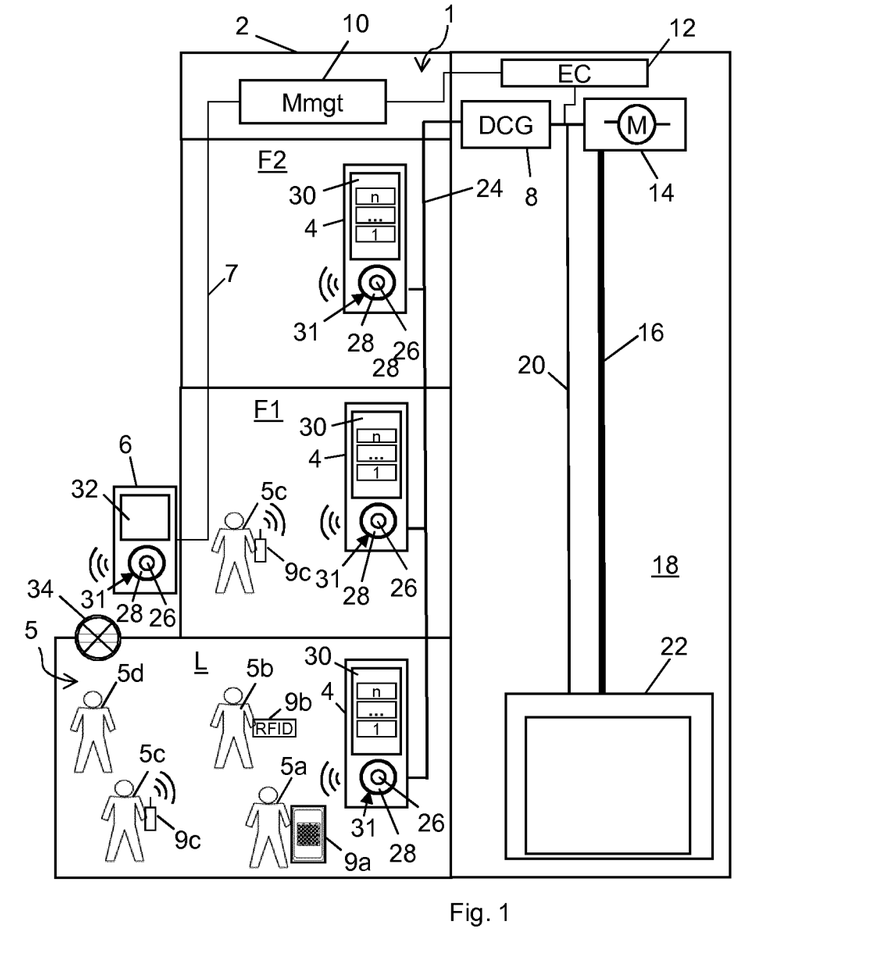
FIG. 1 is a schematic illustration of an exemplary situation in a building having a plurality of floors, a plurality of data capture devices, and a building system that includes an elevator system and an access control system.

FIG. 1 is a schematic illustration of an exemplary situation in a building 2 which has a plurality of floors L, F1, F2 which are served by an elevator system 1. A plurality of users 5a, 5b, 5c, 5d are shown on floor L, and they are referred to as users 5 if no distinction is required to understand the technology described here. The building 2 shown is also equipped with an access control system 10 which controls, for example, access to the building 2 at a building entrance 34, access to the elevator system 1 or to a restricted-access zone within building 2, or both access to the building 2 and access to the elevator system 1 or the restricted-access zone (i.e. an authorized user 5 is granted access and an unauthorized user 5 is denied access). The elevator system 1 and the access control system 10 each represent a building system; the elevator system 1 and the access control system 10 can also be combined to form one (integrated) building system (1, 10) so that the building system offers the functionalities of an elevator system and an access control system.

For purposes of illustration, of the exemplary elevator system 1, FIG. 1 illustrates only one elevator control unit 8, 12, and the latter is equipped with a destination call control unit, a drive machine 14, a suspension element 16 (e.g. steel cables or flat belts), and an elevator car 22 suspended from the suspension element 16 and movable in a shaft 18 (hereinafter also referred to as car 22). The person skilled in the art recognizes that the elevator system 1 can also comprise a plurality of cars 22 in one or a plurality of shafts 18 which are controlled by a group control unit. Instead of a traction elevator shown in FIG. 1, the elevator system 1 can also have one or more hydraulic elevators or a system with a plurality of independently driven and movable cars; these cars require, e.g., no suspension elements.

In the exemplary embodiment shown in FIG. 1, the elevator control unit 8, 12 comprises two subsystems, a call allocation system 8, and a control system 12. The call allocation system 8 comprises a computer which allocates a destination call (i.e., the boarding floor and the destination floor result from an elevator call input on floor L, F1, F2) according to an allocation algorithm of an elevator car 22. Such allocation algorithms are known to the person skilled in the art. The call allocation system 8 can also be referred to as a destination call gateway (DCG). The control system 12 controls the drive machine 14, inter alia, such that the assigned car 22 is moved from a boarding floor to a desired destination floor or to a desired destination on a floor.

In the exemplary embodiment shown, at least one data capture device 4 is arranged on each floor L, F1, F2 and can be used by the user 5 to input elevator calls, for example. The data capture devices 4 are connected to the call allocation system 8 of the elevator system 1 via a communication network 24. In FIG. 1, a user 5 must, for example, provide proof of authorization in order to gain access to the building 2 at at least one further data capture device 6 arranged outside the building 2. The data capture device 6 is connected to the access control system 10 via a communication network 7.

One or a plurality of the data capture devices 4, 6 arranged in the building 2 are designed such that they can detect information in various ways. In FIG. 1, each of the data capture devices 4, 6 is designed in this way; in another exemplary embodiment, not all types of detection can be implemented or activated in some of the data capture devices 4, 6. The data capture devices 4, 6 can detect data, for example, that a user 5 inputs manually using a user interface 30, 32. For this purpose, the user interface 30, 32 can comprise a keyboard or a touch-sensitive screen. Alternatively or in addition thereto, the data capture devices 4, 6 have a reading device 28 in order to detect data from an information carrier 9b, the reading device 28 and the information carrier 9b being embodied for communication in accordance with a known RFID technology. The reading device 28 is also referred to in the following as an RFID reading device 28.

In addition to the RFID reading device 28, the data capture devices 4, 6 have an optical reading device 26 in order to detect an optical code (e.g. barcode, QR code, or color code (e.g. described in WO 2015049186 A1)) from an information carrier. The information carrier can be a portable communication device 9a (e.g. mobile radio device/mobile phone, smartphone, smart watch, tablet PC) that displays the optical code on a display device, or can be another carrier (e.g. made of plastic and/or paper) on which the optical code is printed. The optical reading device 26 can also be embodied to detect a biometric feature of a user 5, for example a fingerprint or an iris pattern. Methods for detecting and processing an optical code or a biometric feature are known to the person skilled in the art.

In one exemplary embodiment, Bluetooth technology can be used as a further radio technology, wherein corresponding radio modules are present in the communication device 9a and in the data capture devices 4, 6. One exemplary Bluetooth technology is Bluetooth Low Energy (BLE) (Bluetooth 4.0).

FIG. 1 illustrates various categories of users 5a, 5b, 5c, 5d corresponding to these options for acquiring the data. The user 5a carries with him as an information carrier, for example, the communication device 9a, which is embodied, inter alia, to display an optical code. The optical code (or its representation in electronic form) can be permanently stored in the communication device 9a, for example, or can be transmitted to the communication device 9a if necessary. If the user 5a would like to obtain access to the building 2 or an elevator, he holds the communication device 9*a* up to the data capture device 4, 6 so that the optical reading device 26 can detect the optical code. The person skilled in the art recognizes that the optical reading device 26, in an analogous manner, detects an optical code which is applied to a non-electronic carrier, for example if the user 5*a* holds such a carrier, instead of the communication device 9*a*, up to the optical reading device 26.

The user 5*b* carries an RFID information carrier 9*b* with him. If the user 5*b* holds the RFID information carrier 9*b* sufficiently close (e.g. less than approx. 5 cm) to the RFID reading device 28, in one exemplary embodiment an antenna integrated in the information carrier 9*b* draws energy from the electromagnetic field generated by the RFID reading device 28 and the information carrier 9*b* uses said energy for generating and transmitting a response signal. The RFID reading device 28 receives the response signal and detects therefrom information assigned to the information carrier 9*b*, for example an identifier (code) which uniquely identifies the information carrier 9*b*.

The user 5*c* carries with him a communication device 9*c* which contains a radio module according to a Bluetooth technology used therein in order to communicate with a radio module in the data capture device 4, 6 that is compatible therewith. The communication takes place when the communication device 9*c* is located in a receiving region defined for the Bluetooth technology used (based on the location of the data capture device 4, 6). During communication, the data capture device 4, 6 detects, for example, an identifier of the communication device 9*c*.

The user 5*d* does not have any of the aforementioned information carriers 9*a*, 9*b*, 9*c* with him. This user 5*d* can manually enter a proof of authorization (e.g. a personal identification number (PIN)) on a user interface 30, 32 of an input device for a data capture device 4, 6. The user interface 30, 32 is used, for example, to confirm the input to the user 5*d* and/or to provide him additional information. The confirmation and/or information can be provided in the form of an audible and/or visible signal (e.g. as a text and/or voice message). The person skilled in the art recognizes that this confirmation/notification functionality of the user interface 30, 32 can also be used when the information carriers 9*a*, 9*b* and 9*c* are used.

The data acquired by the data capture device 4, 6 (e.g. optical code, identifier, PIN) are evaluated by corresponding evaluation devices of the elevator system 1 and/or of the access control system 10. Can the recorded data be assigned to a user after their evaluation and thus identified. If the user can be identified, he is considered to be entitled to use the building 2 and/or certain regions or facilities in the building 2. This use is denied to an unidentifiable user. For an authorized user 5, e.g. the entrance 34 can be unlocked, the data capture device 4 can be released for input of an elevator call, or an (automatic) elevator call to a specified destination floor can be initiated.

In one exemplary embodiment, a profile in a database can be created for each user 5 who is authorized to enter the building 2 and/or use the elevator system 1, the profile containing e.g. personal data (e.g. name, company, any physical limitations, identification data for a mobile device (e.g. identifier, ID code (media access control (MAC) address)), identification data of an employee ID card (badge) with RFID technology or optical code (e.g. QR code or barcode)) and/or person-specific access and/or usage authorizations (e.g. 24/7 access or only on work days between 7:00 a.m. and 6:00 p.m.). The database, implemented in a data storage unit, can be part of the elevator system 1, the access control system 10, a building management system, or another system (e.g. a spatially remote data storage system). If the database is part of the building management system or the spatially remote data storage system, the access control system 10 or the control device 8, 12 of the elevator system 1 has access to the database in order, e.g., to check usage and access authorizations. The database can be administered by a building manager or another service provider, for example.

The users 5*a*, 5*b*, 5*c*, 5*d* can be people who live or work in the building 2, for example. These users 5 are familiar with the building 2 and the use of the building systems 1, 10; they can use their communication device 9*a* or the RFID information carriers 9*b* issued to them as information carriers. The users 5 can also be visitors who are in the building 2 for the first time or who are not there regularly. For example, such visitors can be provided a visitor ID that is based on RFID technology or on which an optical code is printed. Alternatively, an optical code can be transmitted to a visitor in advance, for example by means of an e-mail or a text message; the optical code can then be displayed on-site on the visitor's mobile communication device, for example.

In the situation shown in FIG. 1, the technology described here can be used in an advantageous manner in conjunction with the aforementioned different categories of users 5. Briefly and by way of example, a data capture device 4, 6 is embodied such that, for the purpose of data detection, the RFID information carrier 9*b* and the information carrier (communication device 9*a*) on which an optical code is displayed must be presented at the same point on the data capture device 4, 6. A user 5*b* can hold, e.g., the RFID information carrier 9*b* to the data capture device 4, 6, the RFID information carrier 9*b* can touch the data capture device or be spaced apart from it, another user 5*a* can then also hold the communication device 9*a* at the same point. This point can be made visible on a housing 36 of the data capture device 4, 6 using an identifier, for example by means of a visible and/or tactile (Braille) marking and/or a light effect. In FIG. 1, the identifier is a marking element 31. As shown for illustration purposes, the latter can be a visible circle on a front side of the housing. Different forms and types of identifiers are also possible. As a result, the operation of the data capture device 4, 6 with regard to the various information carriers is standardized and thus also simplified, in particular for users 5 who are not familiar with the building 2.

Figure 2:
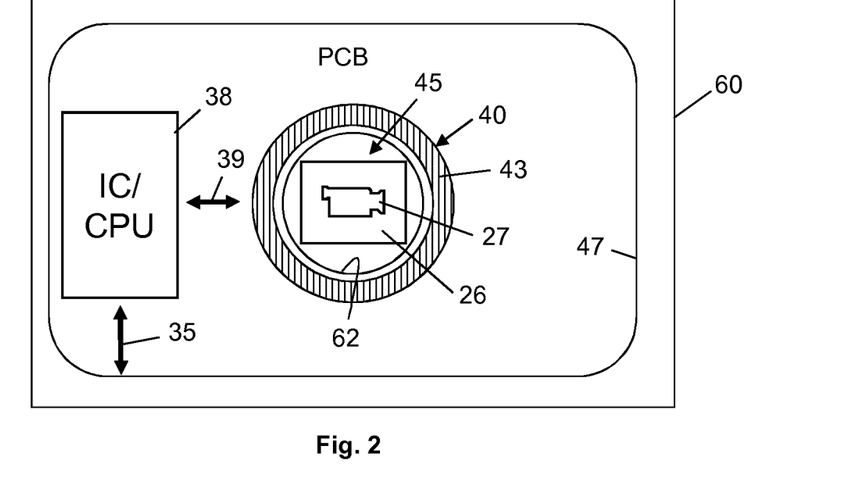
FIG. 2 is a schematic plan view of a first side of an exemplary carrier element for electronic components which is arranged in a data capture device.
Figure 3:
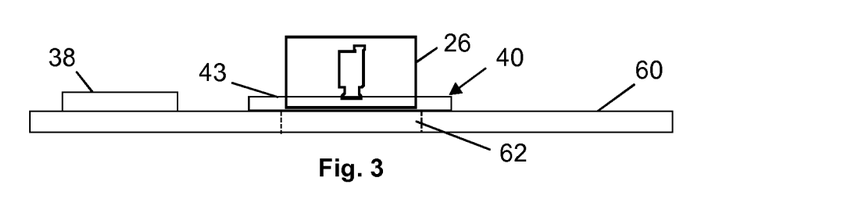
FIG. 3 is a schematic side view of the carrier element from FIG. 2.
Figure 4:
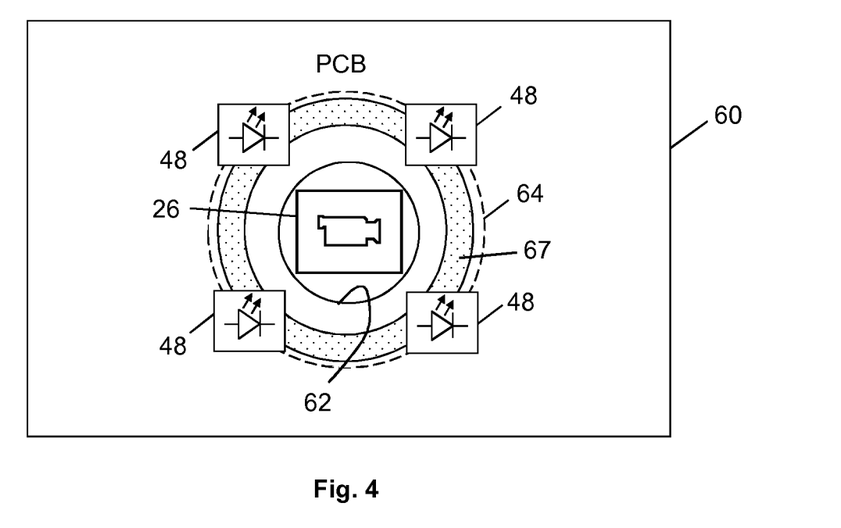
FIG. 4 is a schematic plan view of a second side of the carrier element.

The aforementioned standardization of the data capture device 4, 6 (i.e. the RFID information carrier 9*b* and the information carrier with an optical code (communication device 9*a*) are to be kept at the same point of the data capture device 4, 6) results according to the technology described here from the arrangement of the optical reading device 26 and the RFID reading device 28. Details of this arrangement are shown by way of example in FIG. 2, FIG. 3, and FIG. 4. FIG. 2 is a schematic plan view of a first side of an exemplary carrier element 60 for electronic components, FIG. 3 is a schematic side view of the carrier element 60, and FIG. 4 is a schematic plan view of a second side of the carrier element 60. The carrier element 60 is, for example, a printed circuit board (PCB) which is arranged in a housing 36 (FIG. 5) of the data capture device 4, 6. The carrier element 60 is also referred to as a printed circuit board 60 in the following.

A plurality of electronic components (e.g. discrete components, integrated circuits (IC), processors (CPU), connectors, sockets for plug-in/removable parts or components) are arranged on the printed circuit board 60 and are connected to one another by a network of conductor tracks. The person skilled in the art will recognize that the components can be arranged on one and/or both sides of the printed circuit board 60; some of the components can also be arranged on separate printed circuit boards that can be stacked, e.g. on a plane parallel to the plane of the printed circuit board 60. In FIG. 2 and FIG. 3, the electronic components are combined to form one component module 38 (IC/CPU) for purposes of illustration.

The optical reading device 26 and an antenna 40 of the RFID reading device 28 are arranged on the printed circuit board 60 and are electrically connected to the component module 38 by means of a connection 39. In one exemplary embodiment, the component module 38 comprises the components, ICs, and processors that are communicatively connected to the optical reading device 26 and the antenna 40. The printed circuit board 60 has an opening 62 which creates a passage between a first side of the printed circuit board 60 and a second side of the printed circuit board 60. The opening 62 is circular in the embodiment shown, e.g., it is round with a predetermined diameter (e.g. made by a bore). However, in a different embodiment it can have a different shape, e.g., essentially the shape of a rectangle or a polygon, or other regular or irregular shapes. In FIG. 2-FIG. 4, the opening 62 is provided approximately about the intersection of the diagonals of the rectangular circuit printed board 60. The person skilled in the art will recognize that the opening can also be provided at a different point on the printed circuit board 60.

The optical reading device 26 and the antenna 40 are arranged on the printed circuit board 60 in relation to the opening 62 such that light can fall essentially undisturbed through the antenna 40 and other components on the circuit board 60 onto the optical reading device 26 from the direction of the front of the housing. In the exemplary embodiment shown in FIG. 2, the antenna 40, corresponding to the shape of the opening 62, has a circular cross-section (i.e. in a plane perpendicular to a longitudinal axis of the antenna 40), the antenna 40 essentially surrounding the opening 62.

In one exemplary embodiment, the antenna 40 includes an air coil 43. Windings of the air coil 43 form an inner space 45 of the air coil 43. An inner diameter of the air coil 43 is selected such that it does not project into the opening 62. As indicated in FIG. 2, the antenna 40 or the air coil 43 essentially surrounds the opening 62. The inner diameter of the air coil 43 is, for example, the same as the diameter of the opening 62, but it can also be selected to be larger. In one exemplary embodiment, the diameter of the opening 62 is between 10 mm and 20 mm.

Figure 5:
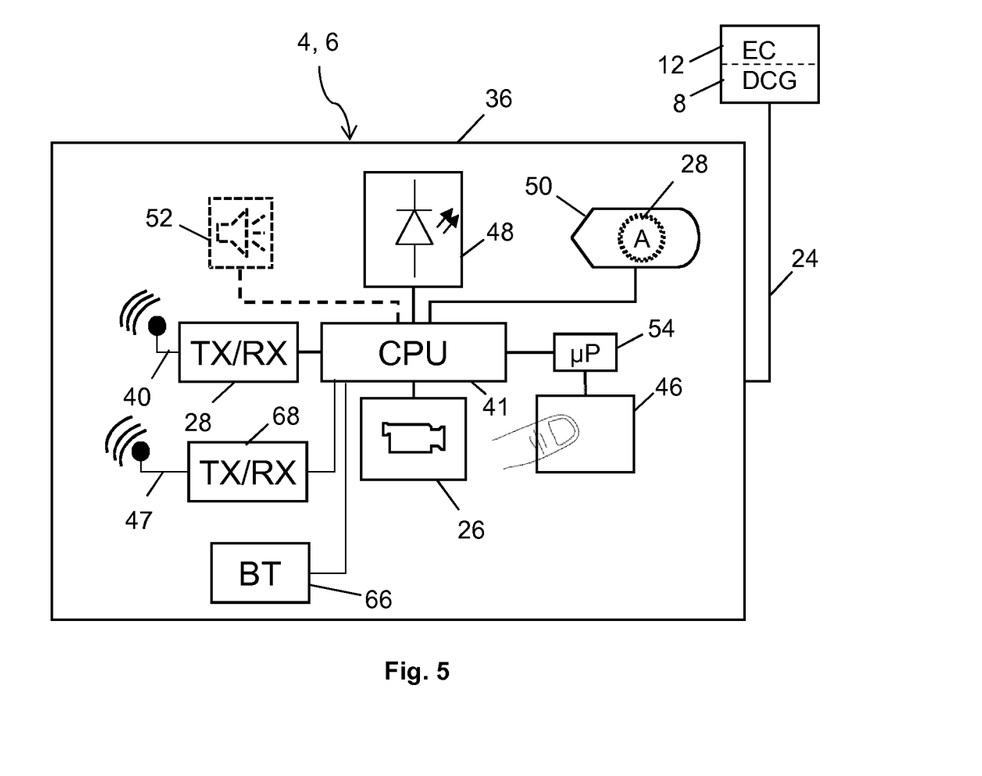
FIG. 5 is a schematic block diagram of an exemplary embodiment of a data capture device.

FIG. 2 also shows a second antenna 47 which is connected to a second reading device 68 shown in FIG. 5. In FIG. 2, the second reading device 68 is contained in the component module 38, which is connected to the second antenna 47 by an electrical connection 35. In the exemplary embodiment shown, the second antenna 47 comprises at least one loop-shaped winding which extends on one side of the printed circuit board 60 essentially along the circumference thereof. The at least one winding is integrated into the printed circuit board 60, for example as a conductor track (possibly covered by an insulating layer) on a surface of the printed circuit board 60.

The first (RFID) reading device 28 is embodied in conjunction with the first antenna 40, for example, for radio communication in a frequency range of approx. 100 kHz-200 kHz, in particular for a frequency of approx. 125 kHz or approx. 134 kHz. The second reading device 68, in conjunction with the second antenna 47, is embodied for radio communication in a frequency range of approx. 10 MHz-20 MHz, in particular for a frequency of approx. 13.56 MHz. The second reading device 68 is also an RFID reading device, but its frequency range differs from that of the first reading device 28. A person skilled in the art recognizes that the information carriers 9b used in the building system 1, 10 are compatible with these reading devices 28, 68, i.e. the information carrier 9b transmits and receives at a frequency of approx. 125 kHz or approx. 134 kHz for radio communication with the first reading device 28 kHz, and an information carrier transmits and receives at a frequency of approx. 13.56 MHz for radio communication with the second reading device 28. In the field of RFID technology, such information carriers 9b are also known as transponders, transponder cards (because of their card-like shape), or smart transponders (because of an embedded chip).

Transponders for use in the lower frequency range of approx. 100 kHz-approx. 200 kHz have a range of a few centimeters, e.g. ≤approx. 2 cm. Transponders for use at a higher frequency of approx. 13.56 MHz have a range of approx. 10 cm. This radio communication is also known as near field communication (NFC) and is standardized, e.g., by ISO 14443 and 18092.

FIG. 3 indicates schematically that the optical reading device 26 extends in the inner space 45 of the air coil 43. Depending on the height of the air coil 43 and the length of the optical reading device 26, the optical reading device extends entirely or partially in the inner space 45 of the air coil 43. The optical reading device 26 can also project farther or less far into the opening 62; it can also project therethrough. The person skilled in the art recognizes that a socket for the optical reading device 26 can be present on the printed circuit board 60, for example, in order to fix the optical reading device 26 in a desired position in relation to the air coil 43. The socket can be designed such that the optical reading device 26 can be removed from it if necessary.

In one exemplary embodiment, the optical reading device 26 comprises a digital camera that comprises an image sensor 27. The image sensor 27 can be part of a part of the digital camera called a lens. Such a digital camera can be arranged on the carrier element 60, with or without a socket. Such digital cameras are known, for example, from their use in smartphones and tablet PCs. The evaluation of an electronic digital signal generated by the image sensor 27 (e.g. corresponding to the detected optical code), which digital signal is present in a format defined for the digital camera (e.g. the jpg/jpeg format), can be carried out in the digital camera or another processing unit (e.g. component module 38) of the data capture device 4, 6.

The image sensor 27, or the digital camera, is arranged such that it can receive light from the direction of a front side of the housing 36 that is accessible to a user 5. Depending on how the image sensor 27 is arranged in relation to the opening 62, i.e., how far the former projects into the opening 62 and/or the air coil 43, light falls through the antenna 40 (or its air coil 43) and the opening 62 onto the image sensor 27.

In FIG. 4 the optical reading device 26, or its image sensor 27, is visible through the opening 62, while the antenna 40 is covered by the printed circuit board 60 and is therefore not visible in this illustration. FIG. 4 also shows a light source 48 which is provided for marking and/or for producing a light effect. The light effect on the housing 36 is visible to the user 5 and identifies the point at which an information carrier 9a, 9b is to be held. In one exemplary embodiment, the light effect is visible to the user 5 through the marking element 31; it can illuminate the marking element 31, for example, from the interior of the housing, so that the marked region differs from the rest of the front side, for example, can be lighter or darker or with light of another color (including white light).

In one exemplary embodiment, the light source 48 comprises one or a plurality of light-emitting diodes (LED). Four light-emitting diodes (48) are shown in FIG. 4 and are arranged essentially evenly distributed along a circular line 64. In addition, an optical scattering element 67 (diffuser) can be arranged, into which the light-emitting diodes feed the light they emit or into which the light-emitting diodes are integrated, in order to distribute light in the desired manner. In one exemplary embodiment, the scattering element 67 is an annular disc that leaves the opening 62 free.

The light source 48 is controlled by a control device that is arranged on the printed circuit board 60 and that in FIG. 2 is contained in the component module 38. The control device can control the light source 48 such that a desired light effect results, for example constant white light or light of a desired color is emitted; the light effect can also vary over time (e.g. the brightness decreases and increases according to a defined pattern) or can be dependent on the operating status of the data capture device 4, 6 or the building system 1, 10 (e.g., red light can indicate an operating error and green light can indicate proper operation).

FIG. 5 is a schematic block diagram of an exemplary embodiment of a data capture device 4 that is connected to the elevator control unit 8, 12 via the line network 24. The data capture device 6 of the access control system 10 is embodied analogously to this. In the housing 36 of the data capture device 4 are the light source 48, a display device 50, an input device 46 for manual inputs, the RFID reading device 28 (TX/RX) with the antenna 40, the second reading device 68 with the antenna 47, a radio module 66 for a known Bluetooth technology, and the optical reading device 26, which are connected to a control device 41 likewise arranged in the housing 54. Depending on the embodiment of the data capture device 4, the latter can comprise an electroacoustic transducer 52 (e.g., a loudspeaker or buzzer) that is connected to the control device 41; the electroacoustic transducer 52 is shown with a dashed line as an optional component. The electroacoustic transducer 52 can be used, for example, to output a voice message or an audible signal tone, for example to acoustically confirm an elevator call to the user 5.

In the exemplary embodiment shown, the control device comprises a central processing unit 41 (CPU) and one or a plurality of processors, which are shown as separate components. One processor 54 is connected to the central processing unit 41 and the input device 46. The processor 54 detects, for example, a signal that is generated by the input device 46 when the user 5 inputs in it a proof of authorization or an elevator call. The person skilled in the art recognizes that the central processing unit 41 and the processor 54, or their functions, can be combined in a control device; accordingly, the function of the processor 54 can be performed by the central processing unit 41, and the illustration of the processor 54 can be omitted in FIG. 5.

Controlled by the central processing unit 41, the display device 50 displays a floor indicator or an elevator indicator (possibly in conjunction with a direction indicator) depending on the situation. In FIG. 5, for illustration the display device 50 shows the elevator or its car ("A") responding to the elevator call.

In one exemplary embodiment, the input device 46 comprises a touchscreen. The functionality and structure of a touchscreen are generally known to the person skilled in the art. In one exemplary embodiment, the input device 46 and the display device 50 produce the user interface 30, 32, which is arranged in the housing 36 such that it is accessible to a user 5. When a touchscreen is used, the input device 46 and the display device 50 are combined and their separate representation can be omitted in FIG. 5.

The light source 48 is used, e.g., to identify the point at which the information carriers 9a, 9b are to be held. In addition to the light source 48, an illumination device can be present which completely or partially illuminates the user interface 30, 32 of the data capture device 4. Controlled by the central processing unit 41, the illumination device can illuminate the display devices 50, or their user interface 30, with white light so that the displayed indicators can be perceived by a user 5, in particular in poor lighting conditions. The illumination device can also illuminate the user interface 30, 32 with colored light in order to confirm to the user 5 the input of an elevator call.

In addition to the RFID reading device 28, in another exemplary embodiment the data capture device 4 can be embodied with a transmitting and receiving device (radio transceiver) for transmitting and receiving radio signals. The radio transceiver communicates with a portable communication device 9c of a user 5 when it is within radio range of the radio transceiver of the data capture device 4, i.e. a radio signal transmitted by the communication device 9c has a signal strength at the location of the radio transceiver (for example expressed by an RSSI value (Received Signal Strength Indicator)) which is greater than a threshold value defined for secure reception. Communication takes place, for example, via a near-field radio network such as, e.g., a Bluetooth radio network, or a WLAN/WiFi radio network. Bluetooth is a standard according to IEEE 802.15.1, and WLAN/WiFi is a standard according to IEEE 802.11; radio networks in accordance with these standards provide wireless networking of devices over a short distance of approx. a few meters.

In one exemplary embodiment, the radio transceiver and the communication device 9c are embodied to communicate with one another in accordance with the Bluetooth standard. If the communication device 9c is a smartphone, for example, application-specific software (also known as an "app") which enables the elevator system 1 to be operated using a user interface can be installed thereon. An example of an app suitable for this application is the myPORT app from the Schindler Group. A user 5 can use the user interface, for example, to select a desired destination floor. The smartphone communicates the selected destination floor to the radio transceiver of the data capture device 4, which forwards the corresponding information to the elevator control unit 8, 12. If the elevator control unit 8, 12 has selected a car 22 for servicing this travel request, an indicator corresponding to this car 22 is displayed on the smartphone of the user 5.

The housing 36 can be configured in various ways in order, e.g., to meet special requirements for the design of the data capture device 4. In one exemplary embodiment, the housing 36 has an essentially flat front. In one exemplary embodiment, the housing 36 is essentially wedge-shaped, with two angled surfaces forming the housing front side; on the rear side, the surface area can be flat, curved or angled. Depending on the desired design, the surfaces of the front can have the same dimensions or different dimensions, e.g. different lengths with the same width. Regardless of the selected shape of the housing 36, the user interface 30, 32 is assigned to a part of the front side of the housing; the reading devices 26, 28 are assigned to another part. The reading devices 26, 28 can be arranged, for example, in a lower part; the marking element 31 is accordingly arranged in this part. At least the marked region can have a material that is transparent to the light to be detected (e.g., glass or plastic) or a material-free opening (e.g., a hole).

The invention claimed is:

1. A data capture device for a building system comprising:
   a housing having a front side and a rear side that is opposite the front side, the housing configured for installation on a floor of a building or at an entrance to a restricted-access region, the building comprising the building system;
   a display device arranged in the housing at the front side of the housing and accessible to a user from the front side of the housing;
   an optical reading device arranged in the housing at the front side of the housing and operable to optically read information from a first information carrier, wherein the optical reading device is arranged such that through an image sensor of the optical reading device, light can be received from the direction of the front side of the housing that is accessible to the user;
   a first reading device arranged in the housing and having a first antenna in order to detect information from a second information carrier, upon the second information carrier being presented at the front side of the housing, by means of radio communication, the first antenna comprising an air coil that has an inner space, wherein the first reading device and the antenna are operable for near field radio communication in a first frequency range between 100 KHz and 200 KHz; and,
   a control device arranged in the housing and communicatively connected to the display device, the optical reading device, and the first reading device;
   wherein the image sensor of the optical reading device is arranged entirely or partially in the inner space of the air coil and faces the front side.

2. The data capture device according to claim 1, further comprising a marking element that on the front side of the housing is visible to a user, the marking element marking a region in which the air coil and the image sensor arranged in its inner space are arranged.

3. The data capture device according to claim 2, in which the front side of the housing in the region marked by the marking element is transparent to light to be detected by the image sensor.

4. The data capture device according to claim 2, also having a light source arranged in the housing and by means of which the marking element can be illuminated.

5. The data capture device according to claim 4, in which the marking element comprises the light source.

6. The data capture device according to claim 4, in which the light source is integrated in a diffuser or feeds light into same.

7. The data capture device according to claim 1, also having a carrier element on which the optical reading device and the first reading device are arranged,
   wherein the carrier element has an opening through which a passage between a first side and a second side of the carrier element is created, and,
   wherein the air coil surrounds the opening.

8. The data capture device according to claim 7, further comprising a second reading device and a second antenna which are operable for radio communication in a second frequency range between 4 MHz and 20 MHz, the second antenna being integrated into the carrier element.

9. The data capture device according to claim 1, further comprising a radio transceiver for communication with a communication device of a user, wherein the radio transceiver is connected to the control device.

10. The data capture device according to claim 1, further comprising an input device with a keyboard or a touch-sensitive surface for manually inputting data.

11. The data capture device according to claim 1, in which the optical reading device comprises a digital camera, the digital camera comprising the image sensor.

12. A building system in a building with at least one data capture device according to claim 1.

13. The building system according to claim 12, in which the at least one data capture device for detecting an elevator call is arranged on a floor of the building.

14. The building system according to claim 12, in which the at least one data capture device for acquiring proof of authorization is arranged at an entrance to a restricted-access region.

* * * * *